United States Patent
Facchinello et al.

(10) Patent No.: US 11,938,800 B2
(45) Date of Patent: Mar. 26, 2024

(54) TONNEAU COVER WITH TORSION ELEMENT

(71) Applicant: Tectum Holdings, Inc., Ann Arbor, MI (US)

(72) Inventors: Jerome Facchinello, Grand Blanc, MI (US); Chad A. Carter, Manchester, MI (US)

(73) Assignee: EXTANG CORPORATION, Ann Arbor, MI (US)

( * ) Notice: Subject to any disclaimer, the term of this patent is extended or adjusted under 35 U.S.C. 154(b) by 0 days.

(21) Appl. No.: 18/104,403

(22) Filed: Feb. 1, 2023

(65) Prior Publication Data

US 2023/0166587 A1 Jun. 1, 2023

Related U.S. Application Data

(63) Continuation of application No. 17/582,089, filed on Jan. 24, 2022, now Pat. No. 11,602,980, which is a continuation of application No. 16/852,714, filed on Apr. 20, 2020, now Pat. No. 11,267,323.

(51) Int. Cl.
*B60J 7/12* (2006.01)
*B60J 7/19* (2006.01)
*B60R 5/04* (2006.01)

(52) U.S. Cl.
CPC ................. *B60J 7/12* (2013.01); *B60J 7/196* (2013.01); *B60R 5/045* (2013.01)

(58) Field of Classification Search
CPC ....... B60J 7/12; B60J 7/14; B60J 7/141; B60J 7/196
USPC ...................................... 296/100.09
See application file for complete search history.

(56) References Cited

U.S. PATENT DOCUMENTS

| | | |
|---|---|---|
| 3,389,739 A | 6/1968 | Kummerman et al. |
| 4,747,441 A | 5/1988 | Apolzer et al. |
| 4,824,162 A | 4/1989 | Geisler et al. |
| 5,301,626 A * | 4/1994 | Penny ..................... B63B 19/19 114/201 R |
| 5,857,729 A | 1/1999 | Bogard |
| 5,887,937 A | 3/1999 | Searfoss |
| 6,095,587 A | 8/2000 | Shirlee et al. |
| 6,113,176 A | 9/2000 | Bernardo |
| 6,560,931 B1 | 5/2003 | Cermola |
| 6,637,796 B1 | 10/2003 | Westerdale et al. |
| 7,281,746 B2 | 10/2007 | Austin |
| 7,322,633 B2 | 1/2008 | Zajicek et al. |
| 7,942,464 B2 | 5/2011 | Schmidt |
| 8,893,834 B2 | 11/2014 | Berkeland |
| 8,960,765 B2 | 2/2015 | Facchinello et al. |
| 9,597,995 B1 * | 3/2017 | Weltikol .................. B60J 7/141 |
| 2002/0069463 A1 | 6/2002 | Dabney |
| 2007/0108792 A1 | 5/2007 | Weldy |
| 2008/0100088 A1 | 5/2008 | Calder et al. |
| 2009/0189406 A1 | 7/2009 | Gleason |
| 2010/0109372 A1 | 5/2010 | Walser et al. |

(Continued)

*Primary Examiner* — Joseph D. Pape
(74) *Attorney, Agent, or Firm* — The Dobrusin Law Firm, P.C.

(57) ABSTRACT

A tonneau cover that includes a first panel, a second panel, a hinge between the first panel and the second panel, and a torsion element between the first panel and the second panel. The torsion element applies an urging force onto one or both of the first panel and the second panel during movement of the first panel and/or the second panel about the hinge.

17 Claims, 6 Drawing Sheets

(56) References Cited

U.S. PATENT DOCUMENTS

| | | |
|---|---|---|
| 2015/0284983 A1 | 10/2015 | Conner et al. |
| 2019/0368255 A1 | 12/2019 | Schatz |
| 2020/0376943 A1* | 12/2020 | Fisher ..................... B60J 7/141 |
| 2021/0155088 A1 | 5/2021 | Amble |
| 2021/0331566 A1 | 10/2021 | Zheng et al. |

* cited by examiner

TONNEAU COVER WITH TORSION ELEMENT

FIELD

These teachings relate to a cover for a vehicle cargo area, and more particularly to a cover with a torsion element that assists with moving one or more panels thereof.

BACKGROUND

Some vehicles, like pick-up trucks, have an open-topped bed or cargo area that may be used for storing or transporting cargo. A cover, such as a tonneau cover or topper, may be placed over the cargo area. The cover may be opened to access the cargo and/or the inside of the cargo area and closed to conceal the cargo from view and/or to prevent fluid and/or debris from entering the cargo area.

Some covers include one or more panels that can be moved or repositioned to access the cargo and/or the inside of the cargo area. Some of these panels may be heavy and large, which can make them unwieldy and difficult to move. Likewise, moving or repositioning the one or more panels to close or cover the cargo area may be difficult.

Some covers include two or more panels that must be moved and stacked on top of each other to access the cargo and/or the inside of the cargo area. The more panels that a cover has, the heavier the stacked weight of the panels becomes, which may be difficult for an operator to completely open the cover to access the cargo area. Likewise, unstacking the panels to cover the cargo area may be difficult Accordingly, it may be desirable to have a cover that overcomes at least some of the aforementioned challenges with opening and closing the one or more panels of a cover.

SUMMARY

These teachings relate to a cover that has one or more panels. The cover includes one or more torsion elements that assist with moving the one or more panels between an open and closed configuration. The cover may have only one panel (e.g., no more than one panel) or the cover may have two or more panels. One or more torsion elements may be provided between two or more panels. One or more torsion elements may be provided between a panel and a portion of a vehicle, such as a bed wall. The cover may be a cap or topper. The cap or topper may have one or more moveable panels or liftgates and one or more torsion elements. The one or more torsion elements assist with moving the liftgate and/or one or more panels between a closed and open configuration and vice versa.

These teachings relate to a tonneau cover that includes a first panel, a second panel, a hinge between the first panel and the second panel, and a torsion element between the first panel and the second panel. The torsion element applies an urging force onto one or both of the first panel and the second panel during movement of the first panel and/or the second panel about the hinge.

DETAILED DESCRIPTION

Figure 1:
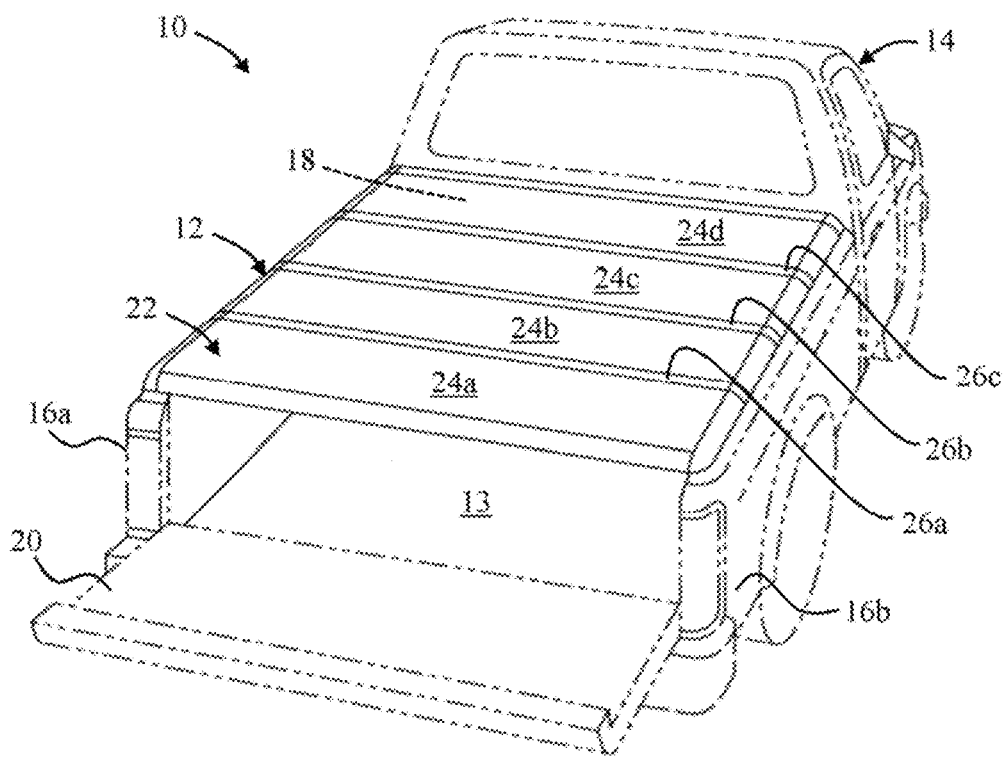
FIG. 1 is a perspective view of a vehicle and a tonneau cover.

These teachings provide a cover. The cover may be an apparatus or assembly for at least partially covering or concealing at least a portion of a vehicle, such as a cargo area. The cover may be a tonneau cover, topper, cap, tent, or a combination thereof.

The cover may be attached, placed, supported, connected or made to rest on one or more top surfaces of the one or more walls defining a cargo area. The cover may be attached, placed, supported, connected, or made to rest on one or more rails or supports that are attached or connected to one or more surfaces of one or more walls defining the cargo area. The cover or one or more components thereof may be an aftermarket product that is/are attached to a vehicle by a vehicle owner. The cover or one or more components thereof (e.g., the one or more panels, torsion elements, frames, frame members, hinges, etc.) may be assembled, installed, and/or integrated into the vehicle or cargo area by an OEM (Original Equipment Manufacturer).

One or more of the features or elements of any of the covers disclosed and/or illustrated herein may be provided or combined with any cover, even though the combination or integration is not illustrated or expressly disclosed herein. Moreover, one element or feature of the cover may be moved or repositioned into another area or feature of the cover. One or more features or elements of any of the covers disclosed and/or illustrated herein may be copied or duplicated. One or more features or elements of any of the covers disclosed and/or illustrated herein may be removed or eliminated. One or more features or elements of any of the covers disclosed and/or illustrated herein may be rearranged into other areas or positions relative to the vehicle depending on the specific construction of the vehicle and/or cargo area. For example, a non-limiting example of this is that the torsion elements 86, 96 illustrated between panels 24d, 24e in FIGS. 12 and 13 may be provided between any two other panels, such as panels 24b, 24c. And the torsion element 26b between panels 24b, 24c in FIG. 6 may be moved to the region between panels 24d, 24e in FIGS. 12 and 13. Similarly, construction of one or more of the panels, frames, frame members, hinges, brackets, spacers, torsion elements, etc. may be repositioned, duplicated, removed, combined, separated, etc. without limitation.

The vehicle may be any vehicle. The vehicle preferably has a cargo area or bed. The cargo area or bed may be any area or portion of a vehicle that may be used for storing and/or transporting goods or cargo. The cargo area may be a cargo box, bed, trunk, storage compartment, or a combination thereof. The cargo area may be located in a front portion of a vehicle, a middle portion of a vehicle, and/or a rear portion of a vehicle. The cargo area may be located behind or adjacent a passenger area of a vehicle, where one or more passengers, occupants, and/or drivers may sit. A cargo area may be a trailer that is configured to be pulled, towed, or pushed by a vehicle. The cargo area may be any part of the vehicle that has an open top. The cargo area or open top can be at least partially closed or covered by a cover. The cargo area may be part of a pickup truck. The cargo area may be part of a utility task vehicle or utility terrain vehicle (UTV). In some configurations, the cargo area may have another cover or top on it, and the cover according to these teachings may be provided between the floor of the cargo area and the cover or top. For example, the cover according to these teachings may be provided inside a vehicle or sport utility vehicle (SUV) to close or cover or conceal contends in the hatch, trunk, or other region of the vehicle.

The cover may be an assembly comprising one or more panels. A panel as used herein may be any of the one or more parts, portions, components, or sections of the cover that are moveable or can be moved relative to another part, portion, component or section of the cover, a vehicle, a cargo area, or a combination thereof. A panel may be a portion, region, or element, between two or more panels that does not move, like a spacer bar. A spacer may be a material, component, or member that is provided or located between or adjacent the one or more panels, hinges, frames, frame members, torsion elements, or a combination thereof. A spacer may be provided between a panel and the cargo area or walls thereof to assist with mounting the cover to the cargo area. A spacer may be provided to cover any gaps between the cover and cargo area. The one or more panels may be a rigid section of the cover, a flexible section of the cover, a frame, a frame member, a spacer, a hinge, or a combination thereof.

The one or more panels may be separate or discrete pieces that are joined together with one or more hinges, spacers, torsion elements, frames, frame members, or other panels.

In some configurations, two or more panels may be defined in or within a single panel. For example, a single panel may be provided that includes one or more living hinges that divide the single panel into two or more panels. A living hinge may be a cutout, detent, notch, groove, channel, thinned-area, flexible material, or a combination thereof formed or added to a panel. Two or more of such panels with one or more living hinges may be combined to define the cover. A living hinge may be one of the hinges used in this application.

The one or more panels may be made of a suitable material, such as plastic, metal, foam, composite, wood, fiberglass, or a combination thereof. The one or more panels may be substantially rigid, soft or flexible, bendable, resilient, or a combination thereof. The one or more panels may comprise a core that is covered in a skin. The core may be a plastic material such as extruded polypropylene or foam. The skin may be a sheet or spray that covers the core. The skin may be TPU, TPV, TPE, and/or TPR. The one or more panels may be made of the same or similar material as the cargo area or fenders so that the cover and the cargo area and vehicle have a uniform appearance. The one or more panels may be made of a single material or may be formed of multiple materials or components that are assembled together. The one or more panels may include one or more frames or frame members that provide strength and rigidity to the panels. The one or more hinges, torsion elements, spacers, frames, frame elements, or a combination thereof may be part of the panel or separate members. The one or more frames or frame members may be covered by a skin or over molded with a material to form the one or more panels. The hinge and/or torsion elements may be over molded or covered by a skin so that the cover has a uniform and sleek appearance, to cover or protect the hinge and/or torsion elements from wear and tear and/or bumping with objects inside the cargo area.

The one or more of the panels can be moved or repositioned relative to one another and/or relative to the cargo area or vehicle to move the cover or one or more panels thereof between a closed configuration and an open configuration and vice versa.

A closed configuration means that the one or more panels are arranged to at least partially conceal, block, hide, restrict, or otherwise prevent sight, access, and/or entry to an inside of the cargo box. In the closed configuration, the one or more panels may be arranged to protect against dirt, debris, fluid, sunlight, and/or other contaminants or items from entering an inside of a cargo area. In the closed configuration, one or more of the panels may be in a generally horizontal position, and free from being stacked or folded on top of another panel. The closed configuration may refer to one or more panels being in a closed configuration or to the entire cover assembly being in the closed configuration. In other words, one of the panels may be in the closed configuration (for example, a panel that is located near or adjacent to the passenger area, while another panel (for example one that is located rearward of the closed panel, closer to the tailgate) is in the open configuration. A closed configuration may be when the one or more panels restrict more access into the cargo area than when the cover or panel is in an open configuration. In other words, a closed configuration may still provide access into the cargo area, but the access or opening is smaller or less than when the cover or panel is in an open configuration. In the closed or partially closed configuration, one or more of the panels may be in any non-horizontal position. A partially closed configuration may be when the panel is more closed than a panel when the panel is in a partially open configuration. In some instances, a partially open configuration and a partially closed configuration may be use synonymously.

An open configuration means that the one or more panels are arranged to at least partially provide access or entry to or into the cargo area or an inside thereof. In the open configuration, one or more of the panels may be moved or repositioned from the closed configuration to provide sight and/or access to an inside of the cargo box. In the open configuration, one or more of the panels may be in any non-horizontal position. In the open configuration, one or more of the panels may be in a generally horizontal position but may be stacked or folded on top of one or more other panels. The open configuration may refer to one or more panels being in an open configuration or to the entire cover assembly being in the open configuration. In other words, one of the panels may be in the closed configuration (for example, a panel that is located near or adjacent to the passenger area, while another panel (for example one that tis located rearward of the closed panel, closer to the tailgate) is in the open configuration.

The one or more panels may be moved from a closed configuration to an open configuration and vice versa by moving, repositioning, or otherwise changing a position of one or more panels relative to one or more other panels, the cargo box, the vehicle, one or more hinges, or a combination thereof. For example, a position of one or more of the panels can be changed by moving, pivoting, folding, swinging, or otherwise turning or flipping one or more panels over or onto another one or more panels about one or more hinges, frames, panels, torsion elements, or a combination thereof. The one or more panels can be manually moved between the closed and open configurations. The one or more panels can be automatically moved between the closed and open configurations via one or more motors, cylinders, actuators, or a combination thereof.

The cover and/or the one or more panels may be an assembly comprised of one or more frames or frame members, one or more hinges, one or more torsion elements, one or more spacers, or a combination thereof.

The cover may include one or more frames. A panel may include one or more frames. A frame may provide structure, rigidity, or stability to the cover and/or reinforce the one or more panels. A frame may prevent the cover and/or one or more panels from twisting, bending, folding, deforming, collapsing, sagging, or otherwise moving in unintended areas or directions. In some configurations, one or more of the panels may be free of a frame. This may be the case if the panel is made from a rigid material, such as a rigid injection molded or composite construction. However, some flexible panels may be free of a frame. In other configurations, a frame may be over molded or covered with a skin to form or define a panel. One or more hinges and/or torsion elements may be covered by the skin or over molded.

A frame may be an assembly or grouping of one or more frame members. One or more frame members may be provided at a front end, a rear end, or on one or more sides of the panel. A frame member may be provided at an angle or diagonal relative to other frame members. A frame member may be provided generally parallel or perpendicular to other frame members. A front end as used herein may be an end or edge of the panel or cover that is located closer to a front of the cargo area or vehicle, relative to an opposing end or edge of the panel or cover. A frame member may be an extrusion, stamping, or molding. A frame member may be constructed or made of a metal, plastic, aluminum, and/or a composite. A frame or frame member may be a bar, rod, pipe, block, rail. A frame member may have any cross-sectional shape, like circular, square, etc. A frame member may be hidden from view, for example, by a skin placed over the frame to give the panel an integrated look when the panel is in the open and closed configuration. If the frame includes two or more frame members, the frame members may be arranged generally parallel to other frame members, generally perpendicular to other frame members, or at any angle relative to one another. A panel or frame may include any number of frame members (e.g., one or more frame members, two or more frame members, three, four, five, etc. or more frame members). The frame members may be provided on a B-side of the one or more panels, along a side or perimeter of the one or more panels, along an A-surface of the one or more panels, or a combination thereof. A frame may be a picture-frame that surrounds the panel. In some instances, a panel may be completely free of any frames or frame members. This may be in situations where the panel is injection molded, thermoformed, or otherwise rigid without the need for additional frames, which may undesirably add weight to the panel and/or cover. However, with the aid of one or more torsion elements, the additional weight may be compensated for by additional and/or stronger torsion elements.

The cover may include one or more hinges. A panel may include one or more hinges. A hinge may be a joint, turning point, juncture, axis, journal or other feature about which one or more panels or spacers can be move, pivot, swing, bend, fold, roll, flex, displace, or otherwise change position relative to one or more other panels, the cargo box, the vehicle, or a combination thereof. A hinge may allow or provide for the one or more panels to be moved between the open and closed configuration, or into a position in between the open and closed configuration.

A hinge may be provided between two panels. A hinge may define or separate two adjacent panels. A hinge may also be attached to both a fixed or nonmoving portion of the vehicle or cargo bed and to a panel of the cover.

A hinge may be comprised of one or more hinges or hinge portions. A hinge may comprise a plurality of hinges provided adjacent one another, which may increase or provide additional movement, pivoting, or folding of the one or more panels relative to each other and/or the vehicle.

A hinge may comprise one or more spacer bars. A spacer bar may be provided between adjacent hinges. A spacer bar may increase spacing between adjacent panels connected to the panels; reinforce or provide rigidity to the hinge assembly or cover or both. One or more torsion elements may be attached to or provided adjacent a spacer bar. One or more of the torsion elements may be attached or connected to a spacer bar. A spacer bar may have the same material or construction as one or more of the panels. The spacer bar may be plastic, metal, injection molded, extruded, or stamped.

A hinge may comprise one or more brackets attached to or made part of the one or more panels or hinges that turn on one or more pins. A hinge may be a living hinge formed or defined in one panel. This means that two or more panels may be part of one unitary panel but divided or defined into separate panels by way of a living hinge. The one or more hinges may be made of an elastomeric and/or resilient material that is added between two adjacent panels.

The cover may include one or more torsion elements. A panel may include one or more torsion elements. A torsion element may provide a force, such as a torsional force, torque, assisting force, and/or urging force that influences or offsets a weight of the one or more panels. A torsion element may function to reduce an amount of force required to move the one or more panels between a closed and an open configuration, and vice versa. A torsion element may assist with lifting or moving the cover or one or more panels between the closed configuration and the open configuration and then from the open configuration to the closed configuration. A torsion element may assist with lifting or moving the cover or one or more panels between a first horizontal position and a second horizontal position. For example, one of the horizontal positions may be when a panel is in a closed configuration and another one of the horizontal positions may be when the panel is moved and stacked on top of an adjacent position so that access is provided into the cargo area.

The one or more torsion elements may be one or more torsion rods, torsion bars, one or more torsion springs, or a combination thereof. The one or more torsion elements may be one or more springs, compression springs, pistons and cylinders, pneumatic cylinders. The one or more torsion elements may be a counterbalance. The one or more torsion elements may be made of spring steel. The one or more torsion elements may comprise a composite material, such as molded or extruded plastic. The one or more torsion elements may be coated in a suitable material to prevent rusting, to prevent the torsion element from rubbing against or damaging a panel. The one or more torsion elements may be covered with a skin or over mold. This may hide the torsion element from view and/or protect the torsion element from wear and/tear and/or elements like rain, water, snow, etc. The skin or over mold may protect the torsion element from damage from being bumped or hit by object in the cargo area during loading and/or unloading.

The torsion element may have opposing ends. One of the ends of the torsion element may be directly, fixedly, connected or attached to a panel, bracket, frame, or frame member, or hinge. One of the ends may be directly, fixedly, connected or attached to another panel, bracket, frame, or frame member or hinge. One of the ends may be directly, fixedly, connected or attached to a fixed portion or non-movable portion of the vehicle or cargo area, such as a fender or wall defining the cargo area. One of the ends One of the ends may be free from directly contacting a panel, bracket, frame, frame member, hinge, or fixed portion of the vehicle or cargo area when the one or more panels are in the open and/or closed configuration. In this arrangement, the torsion element or end thereof may come into contact with the panel, bracket, frame, frame member, or hinge or fixed portion of vehicle or cargo area during movement of the cover or one or more panels between the open and closed configurations.

For example, one of the ends may be directly connected or attached to the one or more panels and/or frame members via a bracket, clamp, adhesive, weld, strap, bushing, retainer, undercut, flange, or a combination thereof. For example, one of the ends may be received into a notch, pocket, recess, cut out, bore, defined in the panel, frame member, spacer bar, hinge. Receiving the torsion element or end thereof into a recess, notch, cutout, or depression may be advantageous to increase packaging space inside the cargo area when the cover is in a closed configuration. Receiving the torsion element or end thereof into a recess, notch, cutout, or depression may be advantageous to decrease packaging space of the cover when the cover and panels thereof are folded into an open configuration. The notch, pocket, recess, cut out, bore, etc., may be formed into one or more panels, hinges, spacer bars, or a combination thereof.

The one or more torsion elements may be attached to adjacent or juxtaposed panels or frame members. The one or more torsion elements may be connected or attached to opposite sides of adjacent panels. For example, one end of a torsion element may be attached to a side of the panel on the driver side of the panel and another end of the torsion element may be attached to a side of the other panel on the passenger side of the panel. The one or more torsion elements may be connected or attached to the same sides of adjacent panels. For example, one end of a torsion element may be attached to a side of the panel on the driver side of the panel and another end of the torsion element may be attached to a side of the other panel also on the driver side of the panel. In some configurations, one end of a torsion element may be attached to a leading end of one panel and another end of the torsion element may be attached to a trailing end or edger of the adjacent panel. In some configurations, there may be one or more torsion elements that are connected between two panels that have another panel provided between the two connected panel.

One or both of the ends may be free from being directly connected or attached to a panel. Instead, one or both of the ends may be located adjacent to or juxtaposed with a panel, panel assembly, frame, frame member, hinge, spacer bar, or a combination thereof.

The connecting region of a torsion element, which may be defined as any portion of the torsion element between the ends thereof, may be attached or connected to a panel, panel assembly, frame, frame member, hinge, hinge assembly, spacer bar, or a combination thereof. The connecting region of the torsion element, or any portion of the torsion element may be connected or attached to a panel, panel assembly, frame, frame member, hinge, plurality of hinges, spacer bar, cargo area, bed, vehicle, topper, or a combination thereof with one or more brackets, straps, fasteners, or a combination thereof. The connecting region of a torsion element may be free from being attached or connected to a panel, panel assembly, frame, frame member, hinge, hinge assembly, spacer bar, or a combination thereof. Instead, the connecting region of a torsion element, may be located adjacent to or juxtaposed to a panel, panel assembly, frame, frame member, hinge, hinge assembly, spacer bar, or a combination thereof.

The one or more torsion elements may be arranged along a B-side of the one or more panels or cover so that when the cover and/or panels are in a closed configuration the one or more torsion elements are not visible from outside of the vehicle. The one or more torsion elements may be visible from outside of the vehicle when one or more of the panels are moved into an open configuration. The one or more torsion elements may be arranged along a B-side of the one or more panels or cover so that the torsion element is visible. The one or more torsion elements may be arranged along a A-side of the one or more panels and may or may not be covered with a skin or other material.

The one or more torsion elements may be centered about a center line of the one or more panels, cover, cargo area, and/or vehicle. Alternatively, the one or more torsion elements may be offset towards one side of the panel, cover, cargo area, and/or vehicle (e.g., towards a driver or passenger side thereof).

The cover may include two or more torsion elements. There may be two or more torsion elements arranged between adjacent panels, which may be advantageous to assist in moving the panels when the panels are substantially heavy. For example, two or more torsion elements may be provided at or near a front end of the cargo area (adjacent to the passenger area) to assist in lifting or moving a plurality of the panels that have been moved or stacked on top of one another. In some configurations that include two or more torsion elements connecting adjacent panels, the torsion elements may be adjacent to one another, cross over or under one another, or both.

A torsion element may be provided between two panels that are connected together with a hinge. Alternatively, in some configurations, the cover may be free of a torsion element provided in a location where two panels are joined with a hinge.

The one or more torsion elements may be formed, bent, or curved in a way that when the one or more panels or cover are in a closed configuration, an amount of packaging space inside of the cargo area is not reduced or taken up by the torsion element. This means that the one or more torsion elements are provided adjacent or juxtaposed with a bottom or B-side of the one or more panels, hinges, frames, frame members, spacers, of a combination thereof.

The one or more torsion elements may have a shape that generally resembles a "Z", "S", "U", "C" or any other regular or irregular shape.

A vehicle 10 is illustrated in FIG. 1. The vehicle 10 comprises a bed or cargo area 12 and a passenger cab 14. The cargo area 12 is defined by a plurality of walls that include: opposing side walls 16a, 16b, a front wall 18 located adjacent the passenger cab 14, and a rear wall or tailgate 20 that opposes the front wall 18. The front wall 18 of the cargo area 12 may be a shared or common wall with a wall of the passenger cab 14. These vehicles may be one piece or uni-body vehicles. In other vehicles, the front wall 18 may be a separate wall, segment, or portion of the vehicle from a rear wall of the passenger cab 14. The front wall 18 may also provide access to the passenger cab 14 via a pass through or fold down wall or door. The cargo area 12 has a bottom or floor 13 that is surrounded by the walls 16a, 16b, 18, 20. The bottom or floor 13 is opposite an open end of the cargo area 12.

A cover 22 may be applied on top of or over the open or top end of the cargo area 12. The cover 22 may include one or more panels. In FIG. 1, the cover 12 includes four panels 24a, 24b, 24c, and 24d. However, the cover 12 may include any number of panels, including as little as only one panel (i.e., no more than one panel; See FIG. 14 for example). The panels may be separated from one another by one or more hinges 26a, 26b, and 26c that allow respective panels to move relative to each other, other panels, the cargo area 12, and/or the vehicle 10. The cover 22 and panels 24a, 24b, 24c, 24d are illustrated in the closed configuration.

For purposes of orientation, panel 24a may be referred to as the first or rear panel; panel 24b may be referred to as the second panel; panel 24c may be referred to as the third panel; panel 24d may be referred to as the fourth or front panel.

Figure 2:
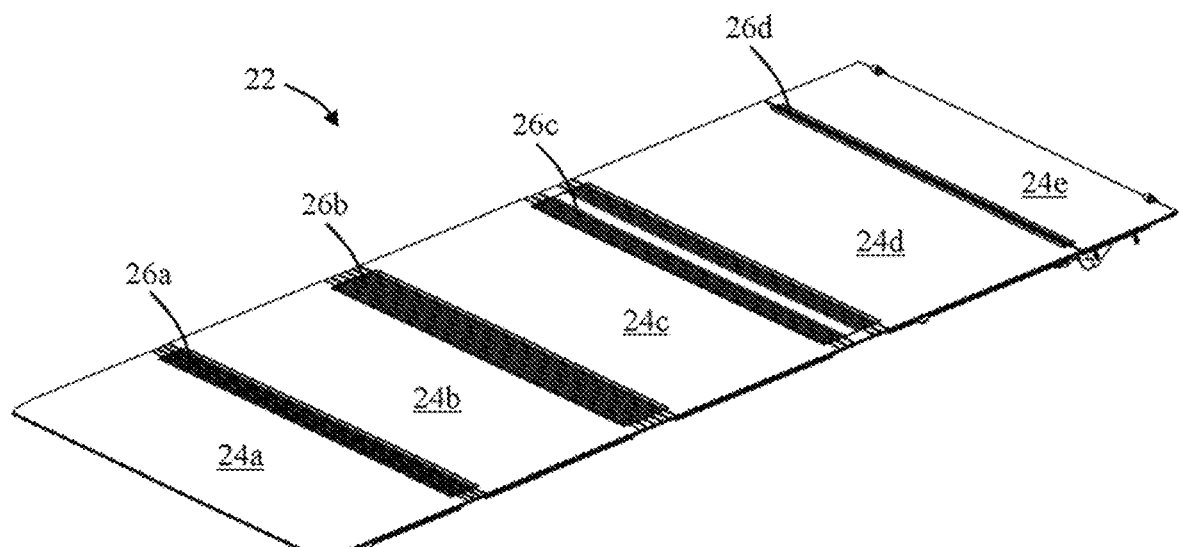
FIG. 2 is a perspective view of a tonneau cover.

Another cover 22 illustrated in FIG. 2 has five panels 24a, 24b, 24c, 24d, and 24e. The panels 24a, 24b, 24c, 24d, and 24e are separated from each other by one or more hinges 26a, 26b, 26c, and 26d that allow for the panels to move relative to each other, other panels, the cargo area 12, and/or the vehicle 10. The cover 22 and panels 24a, 24b, 24c, 24d, 24e are illustrated in the closed configuration.

Figure 3:
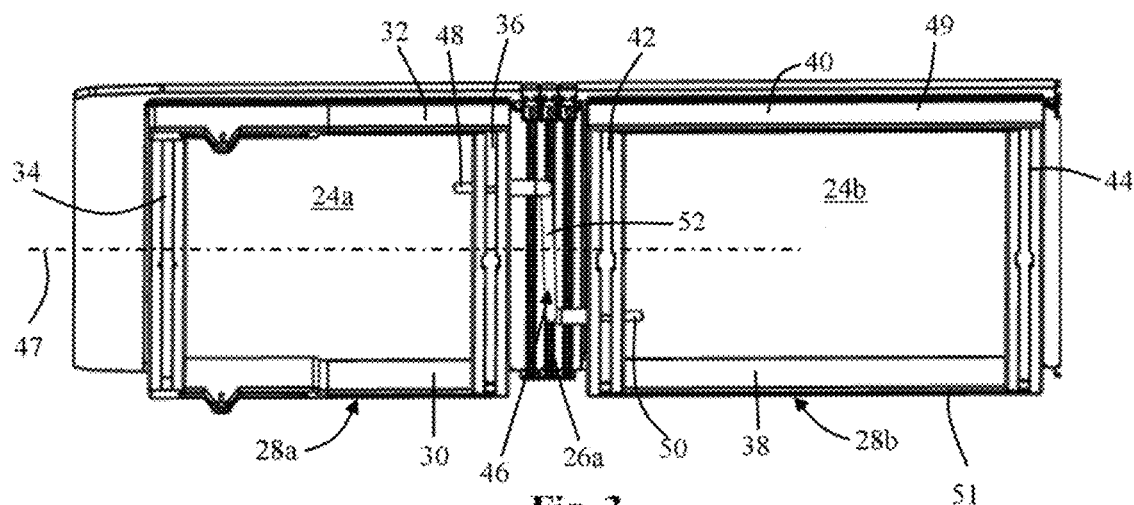
FIG. 3 is a bottom perspective view of a portion of the tonneau cover.

FIG. 3 illustrates the first panel 24a and the second panel 24b of the cover 22. The panels 24a, 24b are separated by hinge 26a. Hinge as used throughout this disclosure may include a single hinge or may include an arrangement or series of a plurality of adjacent hinges. A hinge may also include one or more spacers or spacer bars between adjacent hinges. For example, a spacer bar between adjacent hinges is illustrated and described below in FIG. 9.

One or more of the panels 24a, 24b may comprise a respective frame 28a, 28b. The frame 28a of panel 24a may include one or more frame members, that may include: a pair of first frame members 30, 32 and a pair of second frame members 34, 36. The frame members 30, 32, 34, 36 may be arranged as a picture frame on a B-side of the panel 24a. The frame 28b of panel 24b may include one or more frame members, that may include: a pair of first frame members 38, 40 and a pair of second frame members 42, 44. The frame members 38, 40, 42, 44 may be arranged as a picture frame on a B-side of the panel 24b.

A torsion element 46 may be provided at the first and second panels 24a, 24b. For example, the torsion element 46 may be connected or attached to the first panel 24a, the second panel 24b, to one or both of the frames 28a, 28b, to one or more frame members of the frames 28a, 28b, or a combination thereof. The torsion element 46 may extend along a B-side of the panels 24a, 24b. The B-side is the side that faces an inside of the cargo area 12 or the floor 13 of the cargo area 12 (FIG. 1).

The torsion element 46 may have any suitable shape. In this example, the torsion element 46 has a generally "Z" shape. The torsion element 46 may include a first end 48 and an opposing second end 50. The first end 48 may be adjacent, connected, or attached to the first panel 24a, the frame 28a, and/or to one or more of the frame members of frame 28a, such as frame member 36. The second end 50 may be adjacent, connected, or attached to the second panel 24b, the frame 28b, and/or to one of the frame members of frame 28b, such as frame member 42. The ends 48, 50 may engage bores, pockets, recesses, openings, or other attachment or connection features defined in the corresponding panels 24a, 24b, frames 28a, 28b, frame members 36, 48 or may be connected thereto via a bracket or other mounting mechanism or fasteners.

In some configurations, one or both of the ends 48, 50 of the torsion element 46 are not attached or are free from being attached or connected to one or more of the panels, frames, frame members. Instead, one or both of the ends may be located adjacent to the panels, frames, frame members, or a combination thereof. In such configurations, the one or more ends may press, be pressed against, or come into contact (direct or indirect via one or more other panels, features, elements, spacers, etc.) with the respective panel, frame, frame members, or a combination thereof during movement of the one or more panels between the open and closed configuration and thus apply the torsional or assisting force thereon to assist with further lifting or moving the one or more panels into or towards the closed or open position. Another portion of the torsion element, such as the connecting piece discussed below, may or may not be attached or connected to the frame, frame member, panel, cover, cargo area, and/or vehicle to maintain the relative position of the torsion element relative to the cover and/or vehicle. This discussion referring to the ends and connecting piece being connected to or being free from connecting to the panels or components thereof applies to any of the torsion element configuration or applications disclosed herein, no matter their location on the cover. This also applies to the topper configuration illustrated in FIG. 15.

The torsion element 46 may include a connecting piece 52 extending between the two ends 48, 50. The connecting piece 52 may be arranged or located in a region of the hinge 26a. The connecting piece of any of the torsion elements described herein may be any region of the torsion element 46 between the ends thereof. The torsion element 46 may be a solid, integral member that includes the ends 48, 50 and connecting piece 52. The torsion element may comprise of two or more pieces that are connected together. For example, one or both ends may be connected to a connecting piece. In some configurations, the torsion element 46, connecting piece 52 and/or end thereof may be attached or connected to one or more of the hinges or spacer bars located in the hinge.

The torsion element 46 substantially centered about a center longitudinal axis 47 of the first panel 24a and/or the second panel 24b. However, in some configurations, the torsion element 46 may be shifted or arranged towards one side 49 of the cover or another side 51, which may be passenger and driver sides in vehicle position.

Figure 4:
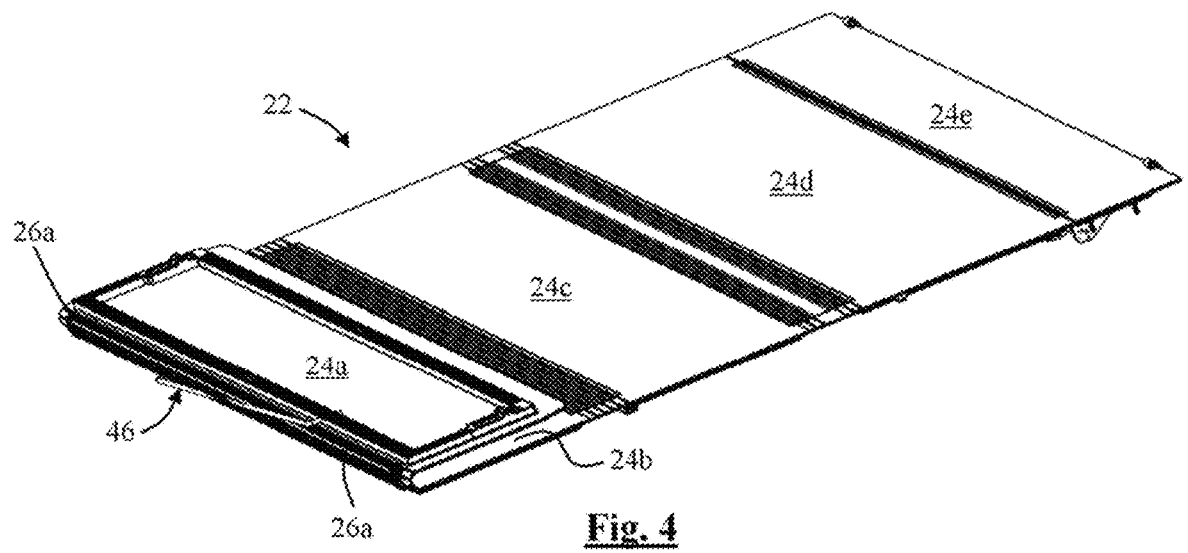
FIG. 4 is a top perspective view of a tonneau cover, with one of the panels moved into an open configuration.
Figure 5:
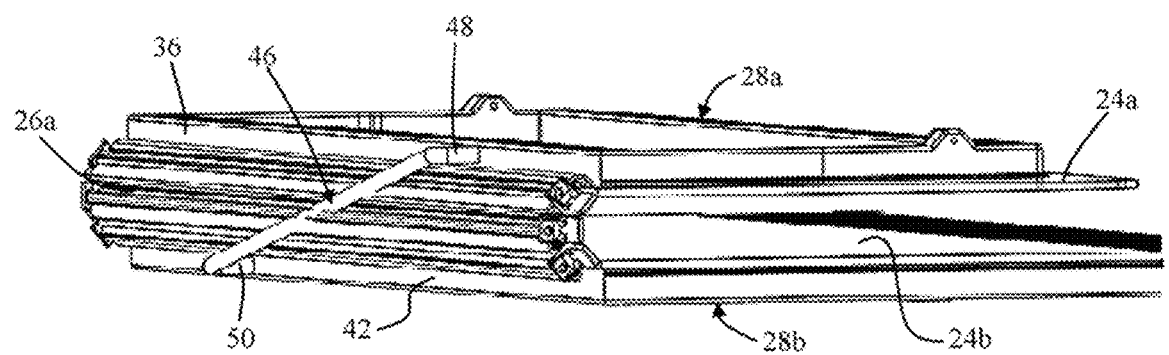
FIG. 5 is a detailed perspective view of the panel of FIG. 4 in the open configuration.

FIGS. 4 and 5 illustrate the first or rear panel 24a moved into the open configuration. In this position, the A-surface of the first panel 24a faces the A-surface of the second panel 24b. The first panel 24a has been moved, pivoted, or otherwise folded up, over, and/or onto the second panel 24b at or about the hinge 26a. During movement of the first or rear panel 24a from the closed configuration (position in FIG. 3) to the open configuration (position in FIGS. 4 and 5), the torsion element 46 assists in moving, pivoting, urging or otherwise folding the first or rear panel 24a up, over, and about the hinge 26a.

The torsion element 46 assists in moving pivoting, urging or otherwise folding the panel 24a because the torsion element 46 is already preloaded, twisted, or otherwise configured to store torque when the panel is in a closed configuration or in an at least partially closed configuration. As the panel 24a begins to be moved from the closed configuration of FIG. 3, the torsion element 46 wants to unwind or twist in the same rotational direction the panel is being moved, thus urging or applying an assisting, urging, or torsional force onto the panel 24a which helps to move the panel 24a from the closed configuration upwardly to a neutral position, which may a position of the panel 24a at a location somewhere between the closed configuration and the open configuration. For example, the neutral position may be when the panel 24a is generally or substantially vertical relative to the adjacent panel 24b. In the neutral position, little or no torque is loaded or stored by the torsion element 46. As the first panel 24a continues to be moved, lowered or dropped down onto the second panel 24b as illustrated in FIGS. 4 and 5, the torsion element 46 may once again be twisted or wound up and store torque. Then, when the first panel 24a is moved from the open configuration (FIG. 4) back into the closed position (FIG. 3), the torsion element 46 once again wants to unwind or untwist and urge or apply an assisting or urging force onto the panel 24a to assist in moving the panel 24a back into the neutral position. As the panel 24a is then dropped or lowered back into the closed configuration (FIG. 3), the torsion element 46 is once again wound or twisted and stores energy. Depending on the amount of torque stored by the torsion element 46, the torsion element 46 may be able to move or urge the panel 24a from the closed configuration (FIG. 3) to the neutral position or even to the open configuration (FIG. 4, 5) with little or no assistance from an operator. Similarly, depending on the amount of torque stored by the torsion element 46, the torsion element 46 may be able to move or urge the panel 24a from the open configuration (FIG. 4, 5) to the neutral position or even to the closed configuration (FIG. 3) with little or no assistance from an operator. The aforementioned description of the torsion element 46 is applicable to any of the torsion elements described herein and any of the covers described herein.

Figure 6:
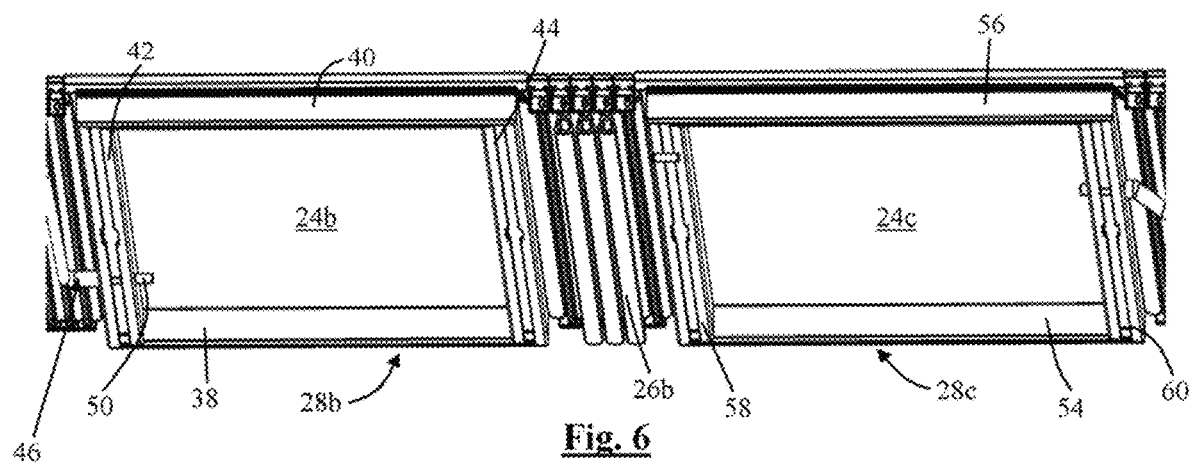
FIG. 6 is a bottom perspective view of a portion of the tonneau cover.

FIG. 6 illustrates the second panel 24b and the third panel 24c of cover 22. The panels 24b, 24c are separated by hinge 26b. Each of the panels 24b, 24c may comprise a frame 28b, 28c. The frame 28b of panel 24b may include one or more frame members, that may include: a pair of first frame members 38, 40 and a pair of second frame members 42, 44. The end 50 of the torsion element 46 is shown engaging panel 24b, as was discussed above in the previous FIGS. 3-5. The frame 28c of panel 24c may include one or more frame members, that may include: a pair of first frame members 54, 56 and a pair of second frame members 58, 60. While no torsion element is shown extended and/or connecting panels 24b, 24c and/or frames 28b, 28c, it is understood that one or more torsion elements may extend between and connect the panels 24b, 24c, the frames 28b, 28c, one or more frame members, or a combination thereof.

Figure 7:
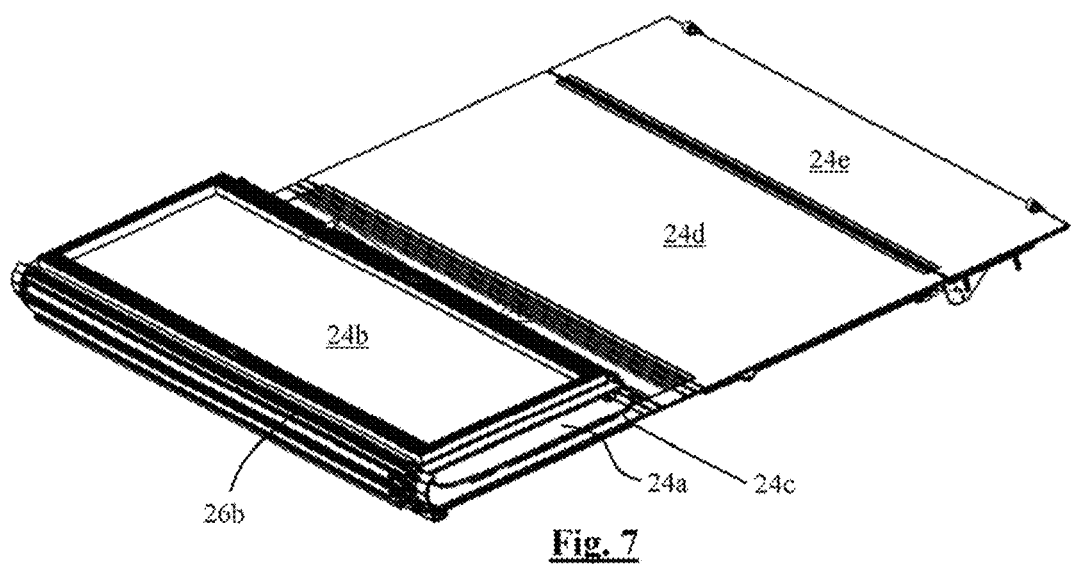
FIG. 7 is a top perspective view of a tonneau cover, with two of the panels moved into an open configuration.
Figure 8:
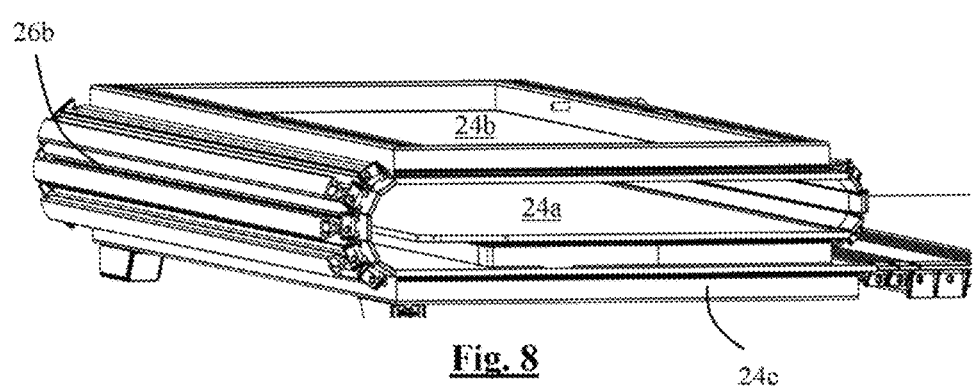
FIG. 8 is a detailed perspective view of the two panels of FIG. 7 in the open configuration.

FIGS. 7 and 8 show the second panel 24b in the open configuration, where the panel 24b has been moved, folded, or otherwise pivoted about hinge 26b. In this open configuration, the first or rear panel 24a is provided between the second and third panels 24b, 24c, and both panels 24a, 24b are folded or stacked on top of the third panel 24c.

Figure 9:
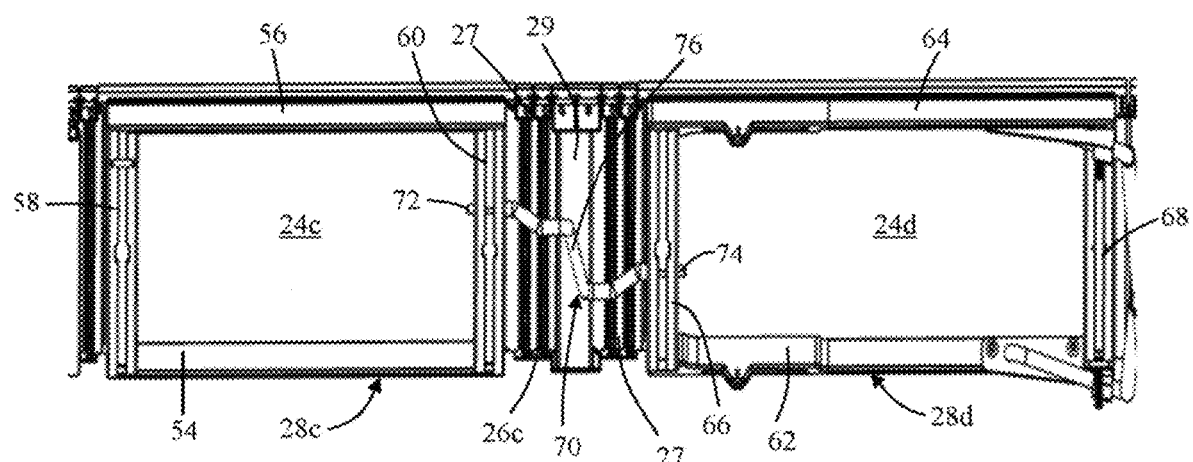
FIG. 9 is a bottom perspective view of a portion of the tonneau cover.

FIG. 9 illustrates the third panel 24c and the fourth panel 24d of the cover. The panels 24b, 24c are separated by hinge 26c. The hinge 26c includes a plurality of hinge members 27 that are connected to a spacer bar 29 therebetween. Such a hinge that includes hinge members and one or more spacers bars may be provided in any of the hinges and covers disclosed herein in any location on the cover. Each of the panels 24c, 24d may comprise a frame 28c, 28d. The frame 28c of panel 24c may include one or more frame members, that may include: a pair of first frame members 54, 56 and a pair of second frame members 58, 60. The frame 28d of panel 24d may include one or more frame members, that may include: a pair of first frame members 62, 64 and a pair of second frame members 66, 68.

A torsion element 70 may be connected or attached to the third panel 24c and the fourth panel 24d, to frame 28c, 28d, to one or more frame members of the frames 28c, 28d, or a combination thereof. The torsion element 70 may extend along a B-side of the panels 24c, 24d when the panels 24c, 24d and/or cover 22 are in the closed configuration.

The torsion element 70 may comprise a generally "Z" shape or a meandering shape that includes a first end 72 and second end 74. The first end 72 may be adjacent, connected, or attached to the third panel 24c, the frame 28c, and/or to one or more of the frame members of frame 28c, such as frame member 60. The second end 74 may be adjacent, connected, or attached to the fourth panel 24d, the frame 28d, and/or to one of the frame members of frame 28d, such as frame member 66. The ends 72, 74 may engage bores, pocket, or openings defined in the corresponding panels 24c, 24d, frames 28c, 28d, frame members 60, 66 or may be connected thereto via a bracket or other mounting mechanism or fasteners. The torsion element 70 may include a connecting piece 76 extending between the two ends 72, 74 and located in a region of the hinge 26c. The torsion element 70 may be a solid, integral member that includes the ends 60, 66, and connecting piece 76.

Figure 10:
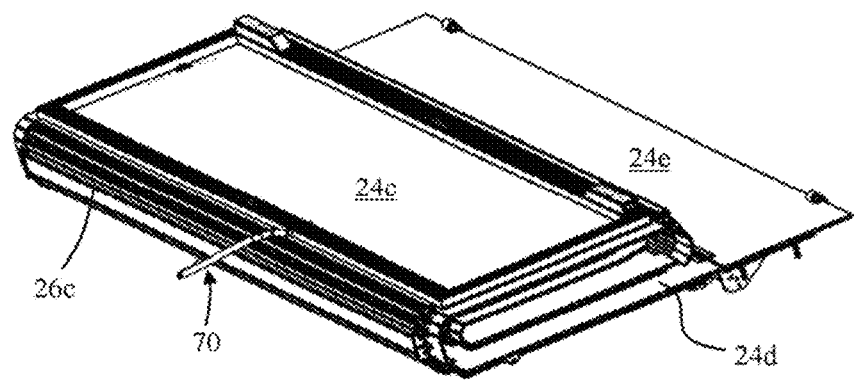
FIG. 10 is a top perspective view of a tonneau cover, with three of the panels moved into an open configuration.
Figure 11:
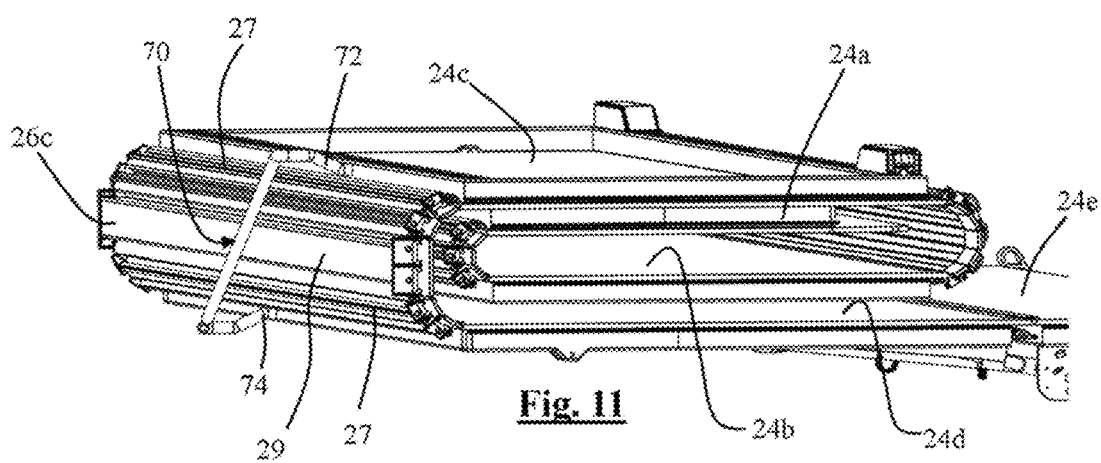
FIG. 11 is a detailed perspective view of the three panels of FIG. 10 in the open configuration.

FIGS. 10 and 11 illustrate the first 24a, second 24b, and third panels 24c of the cover 22 moved into the open configuration. The third panel 24c, which has the first and second panels 24a, 24b stacked on top of it (refer to FIG. 8) is folded onto the fourth panel 24a about hinge 26c. The torsion element 70 assists in moving the weight of the three panels 24a, 24b, 24c into the open configuration of FIGS. 10 and 11 due to its preloading (pre-twisting) and ability to store force. Thus, moving or pivoting the weight of the three panels from the position in FIG. 9 to the position in FIGS. 10 and 11 (or to a neutral position) is much easier compared to if there was no torsion element therebetween.

Figure 12:
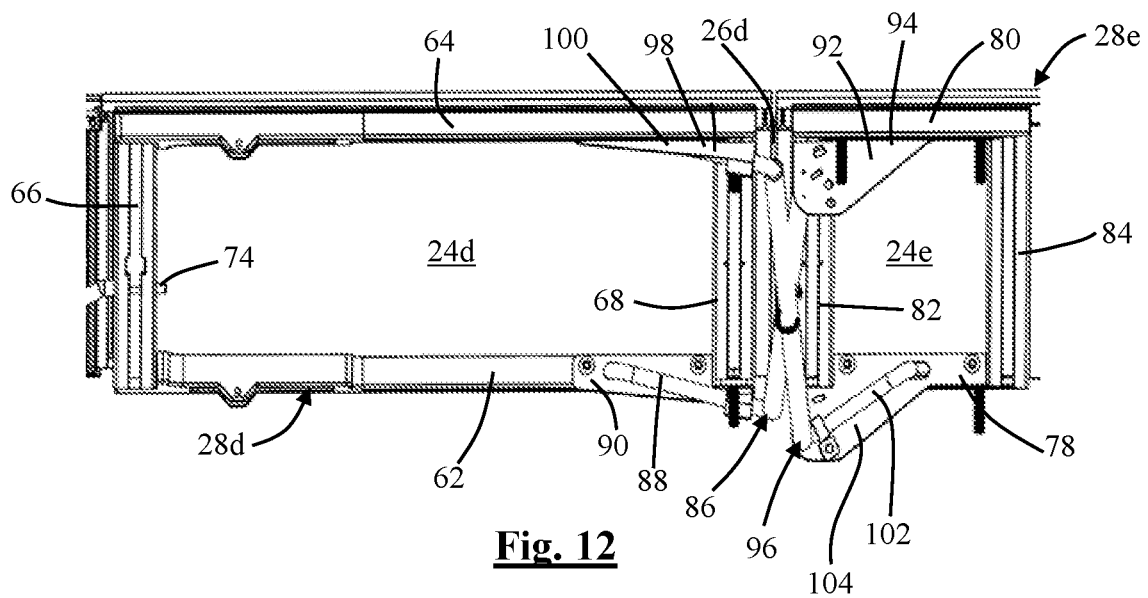
FIG. 12 is a bottom perspective view of a portion of the tonneau cover.

FIG. 12 illustrates the fourth panel 24d and the fifth panel 24e of the cover. The panels 24d, 24e are separated by hinge 26d. Each of the panels 24d, 24e may comprise a frame 28d, 28e. The frame 28d of panel 24d may include one or more frame members, that may include: a pair of first frame members 62, 64 and a pair of second frame members 66, 68. The frame 28e of panel 24e may include one or more frame members, that may include: a pair of first frame members 78, 80 and a pair of second frame members 82, 84

A torsion element 86 may be connected or attached to the fourth panel 24d and the fifth panel 24e, to a frame 28d, 28e, or to one or more frame members of the frames 28d, 28e like members 68 and 82.

The torsion element 86 may comprise a generally "Z" shape and includes a first end 88 and a second end 92. The first end 99 is adjacent, connected, or attached to the fourth panel 24d, the frame 28d, to one or more of the frame members of frame 28d, such as frame member 62, or to a bracket 90 connected to one of the frame members, like frame member 62. The second end 92 may be adjacent, connected, or attached to the fifth panel 24e, the frame 28e, and/or to one of the frame members of frame 28e, such as frame member 80, or to a bracket 94 connected to frame member 80.

Another torsion element 96 may be connected or attached to the fourth panel 24d and the fifth panel 24e and/or to a frame 28d, 28e or one or more frame members of the frames 28d, 28e. The torsion element 96 crosses the torsion element 86 in a region of the hinge 26d. The torsion element 96 may comprise a generally "Z" shape, and includes a first end 98 adjacent, connected, or attached to the fourth panel 24d, the frame 28d, to one or more of the frame members of frame 28d, such as frame member 64, or to a bracket 100 connected to frame member 64. The torsion element 96 may include a second end 102 adjacent, connected, or attached to the fifth panel 24e, the frame 28e, and/or to one of the frame members of frame 28e, such as frame member 78, or to a bracket 104 connected to frame member 78.

Figure 13:
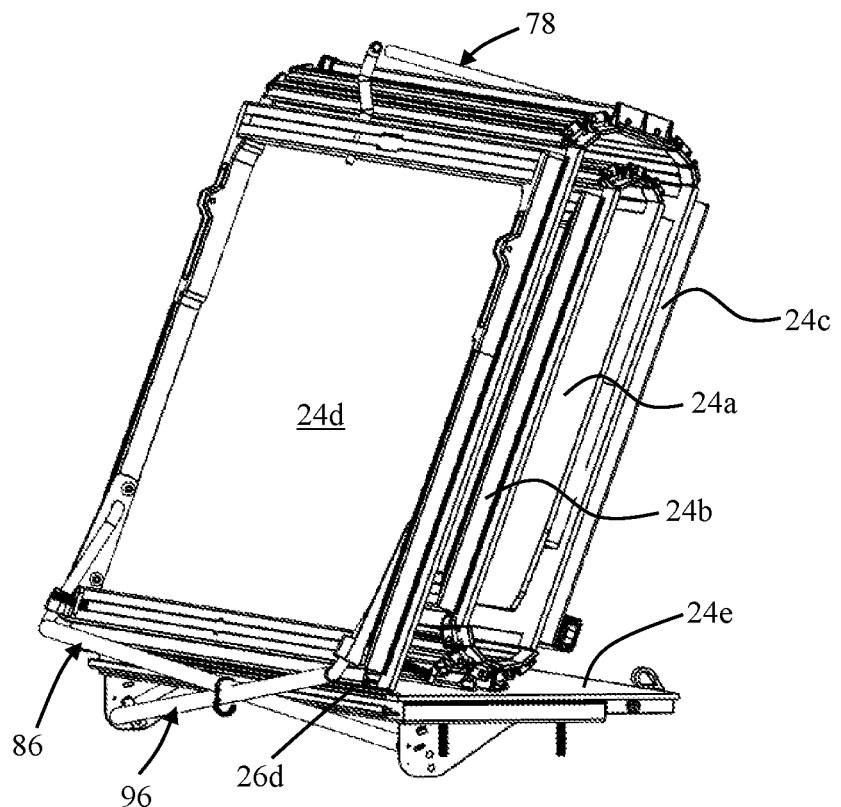
FIG. 13 is a top perspective view of a tonneau cover, with four of the panels moved into an open configuration.

FIG. 13 shows the first 24a, the second 24b, the third panel 24c and the fourth panel 24d of the cover in the open configuration. The fourth panel 24d, which has the first, second, and third panels 24a, 24b, 26c stacked on top of it (refer to FIG. 11) is folded onto the fifth panel 24e about hinge 26d. The torsion element 86, 96 assists in moving the weight of the four panels 24a, 24b, 24c, 24d into the open configuration due to their preloading (pre-twisting) and ability to store force. Thus, moving or pivoting the weight of the four panels from the position in FIG. 12 to the position in FIG. 13 (or to a neutral position) is much easier compared to if there was no torsion elements therebetween. Two torsion elements 86, 96 are provided due to the increased weight of four panels compared to three panels in the previous figures. It is understood, that depending on the number of stacked panels and thus the weigh to the stacked panels, additional torsion elements may be provided. For example, three, four, five, etc. torsion elements may be used.

FIGS. 12 and 13 illustrate attaching the torsion elements to the side frame members 62, 64, 78, 80 via brackets. This type of attachment may be used in the other panels 24a, 24b, 24c. Alternatively, attaching the ends of the torsion elements directly to the frame members as is the case in panels 24a, 24b, 24c may be incorporated into the panels 24d, 24e. However, due to the increased weight of the four panels stacked on top of each other, it may be preferred to attach the torsion elements to the side frame members.

While not illustrated, one or more torsion elements may be between the panel 24e, frame 28e, the frame member 84 and/or frame members 78, 80 and the cargo area 12 or vehicle 10 so that the fifth panel 28e and the panels stacked thereon can be moved or pivoted. This means that another hinge would be provided at or near the edge of the panel 24e where the frame member 84 is located.

It is also understood that there could be more panels than just the five illustrated in the figures. Also, some covers may only include one panel. In such configurations, the one panel may have a hinge connected to it and to the cargo area. One or more torsion elements can be connected to the single panel and the cargo area for assisting in moving the single panel between an open and closed configuration.

Figure 14:
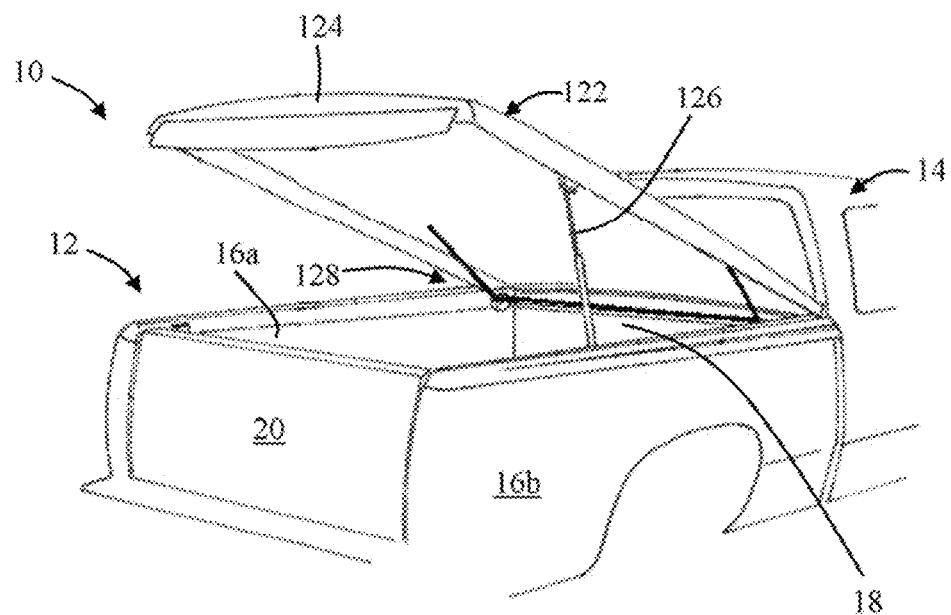
FIG. 14 is a perspective view of a vehicle and a cover.

Referring to FIG. 14, another vehicle 10 is illustrated that may be substantially similar to the vehicle of the previous figures. The vehicle 10 comprises a bed or cargo area 12 and a passenger cab 14. The cargo area 12 is defined by a plurality of walls that include: opposing side walls 16a, 16b, a front wall 18 that is located adjacent to the passenger cab 14, and a rear wall or tailgate 20. The front wall 18 may be a shared wall or portion with the passenger cab 14 or the front wall 18 may be a separate wall from the passenger cab 14.

A cover 122 may be applied or located on top of the open end of the cargo area 12. The cover 122 of FIG. 14 includes only one panel 124 (i.e., no more than one panel). The panel 124 is connected or attached to the cargo area 12 or to one or more walls thereof via one or more hinges, brackets, or other mechanisms that allow the cover 122 or panel 124 to move, pivot, or tilt relative to the cargo area 12 between a closed and the illustrated open configuration. In the closed configuration, the cover 122 or single panel 124 may be in a generally horizontal position.

The cover 122 may have one or more shocks 126. A shock 126 may be located on each side of the vehicle 10 (i.e., on the driver side and the illustrated passenger side) or the cover 122 may include only one shock (i.e., on the driver side or the illustrated passenger side). The shock 126 however, can be located anywhere, even at a center portion of the cover 122. The shock 126 may be a torsion element as used herein to assist with raising and lowering the cover 122 between the closed and open configuration. The shock 126 may be a torsion element as used herein to assist with maintaining a position the cover 122 and/or panel 124 in a position between the closed and open configuration. The shock 126 may restrict or prevent the cover 122 or panel 124 from falling or slamming into the closed position when the cover 122 or panel 124 is being lowered into the closed configuration.

The cover 122 may include one or more torsion elements 128. Torsion element 128 may be in addition to the one or more shocks 126 or instead of the one or more shocks 126. The torsion element 128 may be located at or adjacent to the front wall 18 of the cargo area 12. The torsion element 128 may be located at or adjacent to the hinge, bracket, or other mechanism that allows the cover 122 or panel 124 to move or tilt. The torsion element 128 may be attached directly to the rear wall 18, to one or both of the side walls 16a, 16b, or a combination hereof. The one or more torsion elements 128 may include end portions that are attached to or located adjacent to the panel 124 and come into connect with the panel 124 during movement of the panel 124 between closed and open configurations. The one or more torsion elements 128 may include end portions that are always attached to the panel 124. The one or more torsion elements 128 may include a connecting region between the ends thereof that is located adjacent to the front wall 18, side walls 16a, 16b, panel 124, brackets, hinges, or a combination thereof.

Figure 15:
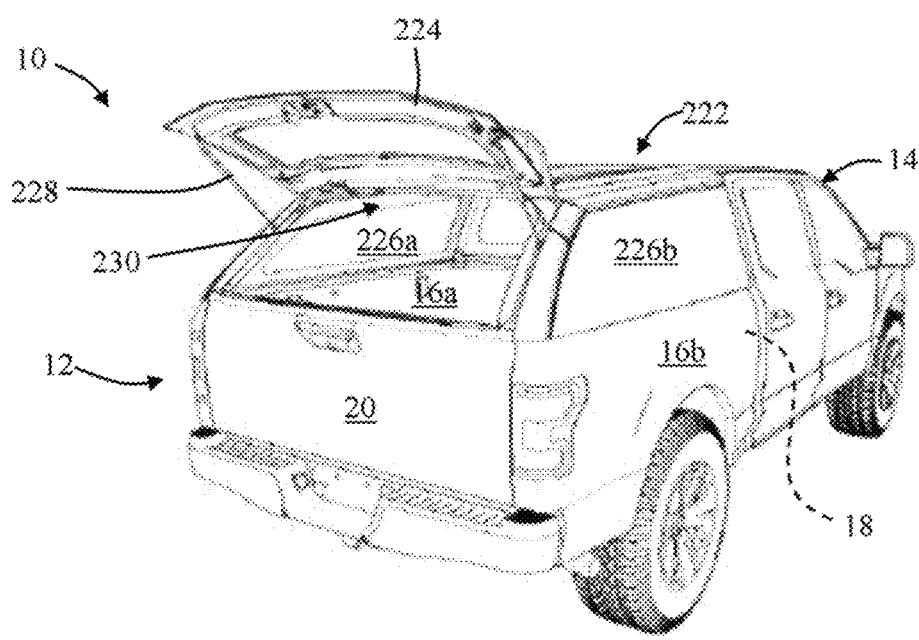
FIG. 15 is a perspective view of a vehicle and a cover.

Referring to FIG. 15, another vehicle 10 is illustrated that may be substantially similar to the vehicle of the previous figures. The vehicle 10 comprises a bed or cargo area 12 and a passenger cab 14. The cargo area 12 is defined by a plurality of walls that include: opposing side walls 16a, 16b, a front wall 18 that is located adjacent to the passenger cab 14, and a rear wall or tailgate 20. The front wall 18 may be a shared wall or portion with the passenger cab 14 or the front wall 18 may be a separate wall from the passenger cab 14.

A cover 222 may be applied on top or over the open end of the cargo area 12. The cover 222 may be a topper or cap that includes a rear panel or lift gate 224 and one or more side panels 226a, 226b. One or more of the panels 224, 226a, 226b may be movable or pivotable between and open and closed configuration. In FIG. 15, the rear panel 224 is movable and is in an open configuration.

The cover 122 may have one or more shocks 228. A shock 228 may be located on each side of the vehicle 10 (i.e., on the driver side and the passenger side) or the cover 222 may include only one shock (i.e., on the driver side or the illustrated passenger side). The shock 228 however, can be located anywhere, even at a center portion of the cover 222. The shock 228 may be a torsion element as used herein to assist with raising and lowering the cover 222 between the closed and open configuration. The shock 228 may be a torsion element as used herein to assist with maintaining a position the cover 222 and/or panel 224 in a position between the closed and open configuration. The shock 228 may restrict or prevent the cover 222 or panel 224 from falling or slamming into the closed position when the cover 222 or panel 224 is being lowered into the closed configuration.

The cover 222 may include one or more torsion elements 230. Torsion element 230 may be in addition to the one or more shocks 228 or instead of the one or more shocks 228. The torsion element 230 may be located at or adjacent to the front wall 18 of the cargo area 12. The torsion element 230 may be located at or adjacent to the hinge, bracket, or other mechanism that allows the cover 222 or panel 224 to move or tilt. The torsion element 230 may be attached directly to the rear wall 18, to one or both of the side walls 16a, 16b, or a combination hereof. The one or more torsion elements 230 may include end portions that are attached to or located adjacent to the panel 224 and come into connect with the panel 224 during movement of the panel 224 between closed and open configurations. The one or more torsion elements 230 may include end portions that are always attached to the panel 224. The one or more torsion elements 230 may include a connecting region between the ends thereof that is located adjacent to the front wall 18, side walls 16a, 16b, panel 224, brackets, hinges, or a combination thereof.

It is understood that any method steps can be performed in virtually any order. Moreover, one or more of the method steps can be combined with other steps; can be omitted or eliminated; can be repeated; and/or can separated into individual or additional steps.

The explanations and illustrations presented herein are intended to acquaint others skilled in the art with the invention, its principles, and its practical application. The above description is intended to be illustrative and not restrictive. Those skilled in the art may adapt and apply the invention in its numerous forms, as may be best suited to the requirements of a particular use.

Accordingly, the specific embodiments of the present invention as set forth are not intended as being exhaustive or limiting of the teachings. The scope of the teachings should, therefore, be determined not with reference to this description, but should instead be determined with reference to the appended claims, along with the full scope of equivalents to which such claims are entitled. The omission in the following claims of any aspect of subject matter that is disclosed herein is not a disclaimer of such subject matter, nor should it be regarded that the inventors did not consider such subject matter to be part of the disclosed inventive subject matter.

Plural elements or steps can be provided by a single integrated element or step. Alternatively, a single element or step might be divided into separate plural elements or steps.

The disclosure of "a" or "one" to describe an element or step is not intended to foreclose additional elements or steps.

While the terms first, second, third, etc., may be used herein to describe various elements, components, regions, layers and/or sections, these elements, components, regions, layers and/or sections should not be limited by these terms. These terms may be used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below", or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The disclosures of all articles and references, including patent applications and publications, are incorporated by reference for all purposes. Other combinations are also possible as will be gleaned from the following claims, which are also hereby incorporated by reference into this written description.

The invention claimed is:

1. A method of operating a tonneau cover, the tonneau cover configured for placement above a cargo area of a vehicle, the cargo area having a plurality of side walls, the method comprising:
a first pivoting step, where a first moveable panel of the tonneau cover is moved on top of a second moveable panel of the tonneau cover about a first hinge, and then a second pivoting step where both of the first moveable panel and the second moveable panel are moved together on top of a third panel of the tonneau cover about a second hinge; wherein during the second pivoting step, a torsion element that is arranged between the second moveable panel and the third moveable panel is configured to apply an assisting force or torque onto the second moveable panel to at least partially offset a weight of at least both of the first moveable panel and the second moveable panel as the first moveable panel and the second moveable panel are together moved on top of the third panel.

2. The method according to claim 1, wherein the torsion element has a Z shape feature.

3. The method according to claim 1, wherein the torsion element comprises a torsion bar.

4. The method according to claim 1, wherein the torsion element comprises a torsion spring, a spring, or a compression spring.

5. The method according to claim 1, wherein the torsion element is attached to the second moveable panel.

6. The method according to claim 1, wherein the second movable panel and/or the third panel comprises a frame, and the torsion element is attached to the frame.

7. The method according to claim 6, wherein the frame comprises a recess into which the torsion element is at least partially received.

8. The method according to claim 6, wherein a bracket is attached to the frame, and the torsion element is attached to the bracket.

9. The method according to claim 1, wherein the second moveable panel is in a generally horizontal position before and after the first pivoting step and the second pivoting step.

10. The method according to claim 1, wherein the first moveable panel is a rear-most panel, and is provided adjacent to a tailgate of the cargo area of the vehicle.

11. The method according to claim 1, wherein the tonneau cover comprises one or more additional panels arranged between the first moveable panel and a tailgate of the cargo area of the vehicle and/or between the first moveable panel and the second moveable panel.

12. The method according to claim 1, wherein the first pivoting step and/or the second pivoting step takes place manually.

13. The method according to claim 1, wherein the first pivoting step and/or the second pivoting step takes place automatically via one or more motors, cylinders, and/or actuators.

14. A method of operating a tonneau cover, the tonneau cover configured for placement above a cargo area of a vehicle, the cargo area having a plurality of side walls, a front wall that is adjacent to a passenger area of a vehicle, and an opposing tailgate, the method comprising:

i) a first moving step where a first movable panel of the tonneau cover is moved in an upwardly direction away from a top end of the tailgate and onto a second movable panel of the tonneau cover, then ii) a second moving step where the first movable panel and the second movable panel are together moved onto a third movable panel of the tonneau cover, and then iii) a third moving step where the first movable panel, the second movable panel, and the third movable panel are together moved onto a fourth panel of the tonneau cover, wherein during the third moving step, a torsion element is configured to apply an assisting force or torque onto the third moveable panel to at least partially offset a weight of at least the first movable panel, the second movable panel, and the third movably panel.

15. The method according to claim 14, wherein the torsion element is not a shock or cylinder.

16. The method according to claim 15, wherein the first moving step and/or the second moving step takes place manually and/or via one or more motors, cylinders, and/or actuators.

17. The method according to claim 14, wherein the tonneau cover further comprises a shock.

* * * * *